I. SAUERWALD.
TIRE GRIP CHAIN FASTENER.
APPLICATION FILED APR. 26, 1921.
1,397,056.
Patented Nov. 15, 1921.
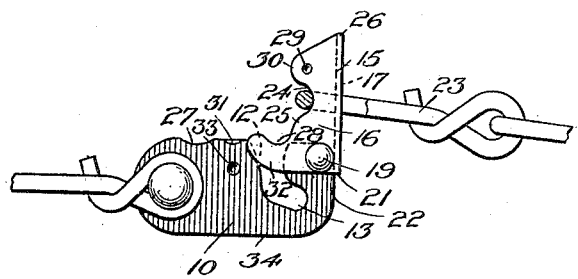
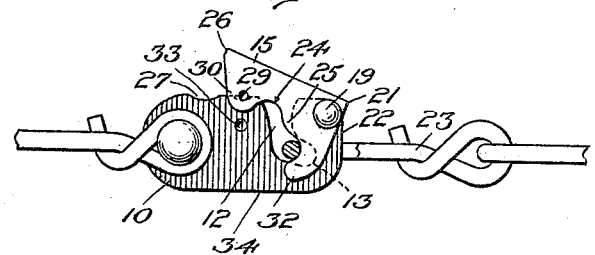
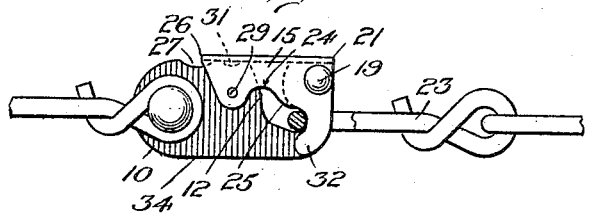
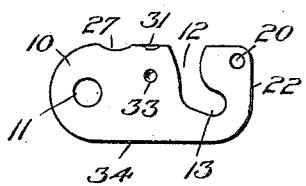 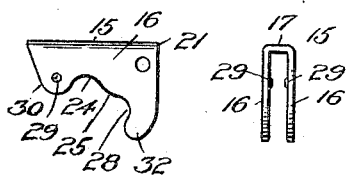 
Witness
Edwin L. Bradford
Inventor
Ivan Sauerwald
By Church & Church
his Attorneys

UNITED STATES PATENT OFFICE.

IRVIN SAUERWALD, OF YORK, PENNSYLVANIA, ASSIGNOR TO UNITED STATES CHAIN & FORGING CO., OF PITTSBURGH, PENNSYLVANIA, A CORPORATION OF DELAWARE.

TIRE-GRIP-CHAIN FASTENER.

1,397,056.   Specification of Letters Patent.   Patented Nov. 15, 1921.

Application filed April 26, 1921. Serial No. 464,547.

*To all whom it may concern:*

Be it known that I, IRVIN SAUERWALD, a citizen of the United States, residing at York, in the county of York and State of Pennsylvania, have invented certain new and useful Improvements in Tire-Grip-Chain Fasteners; and I do hereby declare the following to be a full, clear, and exact description of the same, reference being had to the accompanying drawings, forming part of this specification.

This invention relates to a fastener particularly intended for securing together the ends of a tire grip chain but applicable for other uses as well.

The object of the present invention is to provide a fastener of this general type that will be simple of manufacture and easier to operate than the fasteners now on the market.

A further object of the invention lies in the provision of a fastener which will secure a slight take-up in the chain by hooking the loose end link of the side chain into the hook recess or the pivoted keeper.

A still further object of the invention lies in the provision of a coöperating connector and keeper so fashioned that the fastener may be locked by a pull on the side chain and may be opened by a push on the side chain.

Further objects of the invention will be apparent from the following description and the claims at the end thereof.

In the original anti-skid tire grip chain locks now in use, a hook member is secured to one end of the side chain and is provided with a number of slots or recesses to receive the free end of the side chain. A number of these devices provide a pivoted keeper which may be driven into place to hold the free link in one of the recesses. The present invention differs but slightly from the known types but these slight differences individually and collectively materially increase the ease of operation and aid in the convenience of the rapid applying and removing of the anti-skid tire chains.

In the present fastener the pivoted keeper is provided with a hook end adapted to receive the loose end link of the side chain without difficulty. When this end link is in place the pivoted keeper may readily be turned on its pivot so as to gently throw the end link into position in the receiving slot of the connector. The keeper is then locked in position by pulling on the chain at either side of the fastener, since the link engages the tongue of the keeper and any pressure on the chain will pull this tongue rearwardly which will bring the detent on the keeper into engagement with the socket bored in the connector. Particular attention is invited to the fact that the keeper is provided with a stop to limit its movement away from the connector, and at the end of its movement the keeper is in position to receive the free link of the side chain.

In the drawings,—

Figure 1 shows a chain equipped with the fastener of the present invention, the parts being shown as they would appear after the free end link has been caught in the hook recess of the keeper.

Fig. 2 is a similar view after the keeper has been turned on its pivot so as to bring the detents into contact with the beveled portions of the connector.

Fig. 3 shows the chain and fastener as they would appear when the anti-skid chain is in use.

Fig. 4 is a view of the connector alone.

Fig. 5 is a side view of the keeper; and

Fig. 6 is an end view thereof showing the saddle shape of the keeper.

The connector 10 is provided with a circular orifice 11 of such size as to conveniently receive the end link of the chain to be fastened and is provided with a link receiving slot 12 leading to a downward extending recess or cove 13 which holds the free end link of the chain when the device is in use. The keeper 15 is preferably a stamping of sheet metal having two similar parallel sides 16 connected together by a back 17.

The keeper is secured to the connector by means of a stud or pivot 19 passing through the hole 20 in one corner of the connector and so arranged that the end 21 of the back of the keeper will engage the end face 22 of the connector so as to hold the members in the position shown in Fig. 1 when the free end link 23 of the chain is secured in the hook recess 24 of the keeper.

At its free end the keeper is shaped to a point 26 which lies approximately at the center of the groove 27 in the connector when the parts are in locked position, this structure providing a convenient means for raising the keeper should it become locked without having the end link of the chain in the recess 13.

When the keeper is turned about its pivot 19 from the position shown in Fig. 1 to that shown in Fig. 2 the end link 23 of the chain rides from the hook recess 24 over the bridge 25 and into the tongue recess 28 of the keeper at which time the punched-out lugs or detents 29 in the hook 30 will have engaged the beveled portions 31 of the connector, this beveling being formed in the connector to assist in the ease of locking the members together.

By now pulling on the chain at either side of the fastener the pressure exerted by the end link on the tongue 32 will turn the keeper still further on its pivot and will cause the two hooks 30 to yield slightly so as to ride down the side faces of the connector until the detents 29 are received within the sockets 33 bored or punched in either side of the connector, these sockets being so arranged as to correspond in position with the detents 29 when the back of the keeper is parallel with the lower edge or back 34 of the connector.

The operation is believed to be apparent from the foregoing description. The keeper is thrown upwardly until the stop portion 21 of the back engages the rear wall 22 of the connector. The free end link 23 is now caught in the hook recess 24 and the keeper is turned on its pivot throwing the link down the slot 12 and partly into the recess or cove 13 with the two inward directed detents riding on the beveled portion of the connector. A pull on the chain forces the tongue 32 to bring the edge of the keeper into registry with the end face 22 of the connector at which time the fastener will be locked in position.

To open the fastener, it is only necessary to hold the connector in one hand and the end link of the side chain in the other and press them together. This will cause the end link to engage either the bridge 25 or the wall of the hook recess 24 and to force the keeper to turn on its pivot thereby freeing the end link.

What is claimed is:

1. In a chain fastener, a connector having a link receiving slot, and a saddle-shaped keeper pivoted to said connector and having a recess therein adapted to receive said link initially and to direct same into said link receiving slot when said keeper is turned about its pivot, said keeper having an abutment in proximity to said pivot and adapted to engage said connector when the keeper is in open position.

2. In a chain fastener, a connector formed of a flat sheet of metal having a downward directed link receiving cove, a slot leading to said cove at an obtuse angle, and a saddle-shaped keeper pivoted to said connector and adapted to close the open end of said slot, a resilient hook forming projection extending from said keeper on either side of said connector, and means carried by one of said projections for retaining the keeper in closed position.

3. In a chain fastener, a connector having a link receiving slot therein and a groove adjacent the mouth of said slot, and a keeper pivoted to said connector and adapted to close the mouth of said slot, said keeper ending in a lever receiving point positioned above said groove when the keeper is in closed position.

4. In a chain fastener, a connector formed of a flat sheet of metal having a downward directed link receiving cove, a slot leading to said cove at an obtuse angle, and a saddle-shaped keeper pivoted to said connector and adapted to close the open end of said slot, and a tongue extending from said keeper and adapted to lie entirely to one side of said cove in closed position and entirely to the other side of said cove in open position.

5. In a chain fastener, a connector having a link receiving slot, and a saddle-shaped keeper pivoted to said connector and having a recess therein adapted to receive said link initially and to direct same into said link receiving slot when said keeper is turned about its pivot, and a pair of tongues integral with said keeper and lying in the path of said link after movement of said keeper about its pivot, and locking means operable by pivotal movement of said keeper in the same direction.

6. In a chain fastener, a connector member adapted to be secured to one end of a chain and having a slot therein to receive a link, a keeper pivoted to said connector and having a tongue adapted in one position to close said slot, and means carried by said keeper for limiting the pivotal movement of said keeper on said connector to less than 180°.

IRVIN SAUERWALD.